(12) United States Patent
Thia et al.

(10) Patent No.: US 6,690,533 B2
(45) Date of Patent: Feb. 10, 2004

(54) DRIVE LEVEL ACTUATOR IMBALANCE TORQUE TEST

(75) Inventors: Terang KongBeng Thia, Singapore (SG); Joseph HengTung Lau, Singapore (SG); Jeffrey SoonBeng Sim, Singapore (SG); Stephen KowChiew Kuan, Singapore (SG); CheeWai SeeToh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 318 days.

(21) Appl. No.: 09/792,648

(22) Filed: Feb. 23, 2001

(65) Prior Publication Data

US 2001/0038508 A1 Nov. 8, 2001

Related U.S. Application Data

(60) Provisional application No. 60/184,699, filed on Feb. 24, 2000.

(51) Int. Cl.$^7$ ............................. G11B 21/02; G01M 1/00
(52) U.S. Cl. .............................................. 360/75; 73/66
(58) Field of Search ................................ 360/75, 77.02, 360/69, 31, 97.01, 97.02, 97.03, 55; 29/603.03; 73/66, 462

(56) References Cited

U.S. PATENT DOCUMENTS

| | | |
|---|---|---|
| 4,068,302 A | 1/1978 | Olmstead |
| 4,835,633 A | 5/1989 | Edel et al. |
| 5,400,196 A | 3/1995 | Moser et al. |
| 5,426,545 A * | 6/1995 | Sidman et al. ............ 360/78.09 |
| 5,537,272 A | 7/1996 | Kazmierczak et al. |
| 5,555,144 A | 9/1996 | Wood et al. |
| 5,654,840 A | 8/1997 | Patton et al. |
| 5,659,136 A | 8/1997 | Koch et al. |
| 5,781,363 A | 7/1998 | Rowan et al. |
| 5,898,286 A | 4/1999 | Clare et al. |
| 6,189,371 B1 * | 2/2001 | Hirano ........................ 73/66 |
| 6,349,464 B1 * | 2/2002 | Codilian et al. ......... 29/603.03 |

* cited by examiner

Primary Examiner—Andrew L. Sniezek
(74) Attorney, Agent, or Firm—Mitchell K. McCarthy

(57) ABSTRACT

The present invention provides a method to determine and to locate the position of the imbalance torque of an actuator in a disc drive. There are several steps performing different functions in the method. The first step of the method performs the function of obtaining a difference in the voice coil motor (VCM) current of the disc drive in the X orientation and in the Y orientation with the VCM current of the disc drive when the disc drive is placed flat. The second step performs the function of obtaining the square of each difference in VCM current. The third step performs the function of obtaining the imbalance by adding the square of the VCM current and subsequent square root of the addition. The valve of the imbalance torque is obtained by multiplying the imbalance with the torque constant. The fourth step performs the function of obtaining a division value of the VCM current in the X orientation or in the Y orientation with the VCM current of the disc drive when the disc drive is placed flat. The fifth step performs the function of obtaining the angle between the x-axis and the distance of the imbalance torque of the actuator from the pivot centre and measuring the mass of the actuator. The sixth step performs the function of obtaining the cosine or sine of the angle and multiple either angle with the mass of the actuator. The position of the imbalance torque is located and determined either from dividing the divided value in X orientation in the fourth step with the cosine angle in the sixth step or dividing the divided value in Y orientation in the fourth step with the sine angle in the sixth step.

14 Claims, 7 Drawing Sheets

DRIVE LEVEL ACTUATOR IMBALANCE TORQUE TEST

CROSS REFERENCE TO RELATED APPLICATIONS

This application claims the benefit of U.S. Provisional Application No. 60/184,699, filed Feb. 24, 2000.

FIELD OF THE INVENTION

The present invention relates generally to disc drives, and more particularly to determine the actuator imbalance torque as well as to locate the position of the imbalance torque.

BACKGROUND OF THE INVENTION

The track following servo systems in disc drives are required to hold the read/write heads to very small off-track errors to support the increasing track density of today's products. As errors can be induced due to many effects including disc and bearing runout, servo-track-writer induced irregularities, electronic noise, spindle and actuator resonances, and external shock and vibration excitations, modern disc drives must be designed and tested to perform satisfactorily to increasingly stringent specifications of shock and vibration. This is especially due to the needs of the portable computing market. Thus, there exists a need to be able to predict track following performance under external shock and vibration excitation. The ability to measure the actuator imbalance will be a good indication of the drive performance under shock and vibration condition.

In the existing setup to measure imbalance torque, the actuator is held to be free to rotate about its cartridge centre which is the pivot point and a load cell is located one inch from this point. The distance from the pivot point to the load cell multiplied by the force to move the actuator will give the imbalance torque. However, there are problems in using this method. Firstly, there is a need to remove the flex cable since it will contribute to the actuator an additional imbalance during measurement. Secondly, the location of the load cell may not be accurate enough to obtain a good measurement. Thirdly, the measurement could only be carried out at the component level.

Thus there remains a need for a more accurate and sophisticated method to determine the imbalance torque. It will be evident from the following description that the present invention offers this and other advantages.

SUMMARY OF THE INVENTION

The present invention relates to a more accurate method of determining the imbalance torque of an actuator in a disc drive at drive level and of locating the position of the imbalance torque using voice coil motor bias current values so as to diagnose the mechanical and servo performances of the disc drive.

According to one aspect of the invention, there is provided a method to sense the change in the voice coil motor (VCM) current to determine and to locate the position of the imbalance torque of an actuator in a disc drive. There are several steps performing different functions in the method. The first step of the method performs the function of obtaining a difference in the VCM current of the disc drive in the X orientation and in the Y orientation with the VCM current of the disc drive when the disc drive is placed flat. The second step performs the function of obtaining the square of each difference in VCM current. The third step performs the function of obtaining the imbalance current by adding the square of the VCM current and subsequent square root of the addition. The value of the imbalance torque is obtained by multiplying the imbalance current with the torque constant of the voice coil magnet. The fourth step performs the function of obtaining a division value of the VCM current in the X orientation or in the Y orientation with the VCM current of the disc drive when the disc drive is placed flat. The fifth step performs the function of obtaining the angle between the x-axis and the distance of the imbalance torque of the actuator from the pivot centre and measuring the mass of the actuator. The sixth step performs the function of obtaining the cosine or sine of the angle and multiple either angle with the mass of the actuator. The position of the imbalance torque of the actuator is located and determined either from dividing the divided value in X orientation in the fourth step with the cosine angle in the sixth step or dividing the divided value in Y orientation in the fourth step with the sine angle in the sixth step.

These and other features as well as advantages, which characterize the present invention, will be apparent upon reading of the following detailed description and review of the associated drawings.

DETAILED DESCRIPTION

Figure 1:
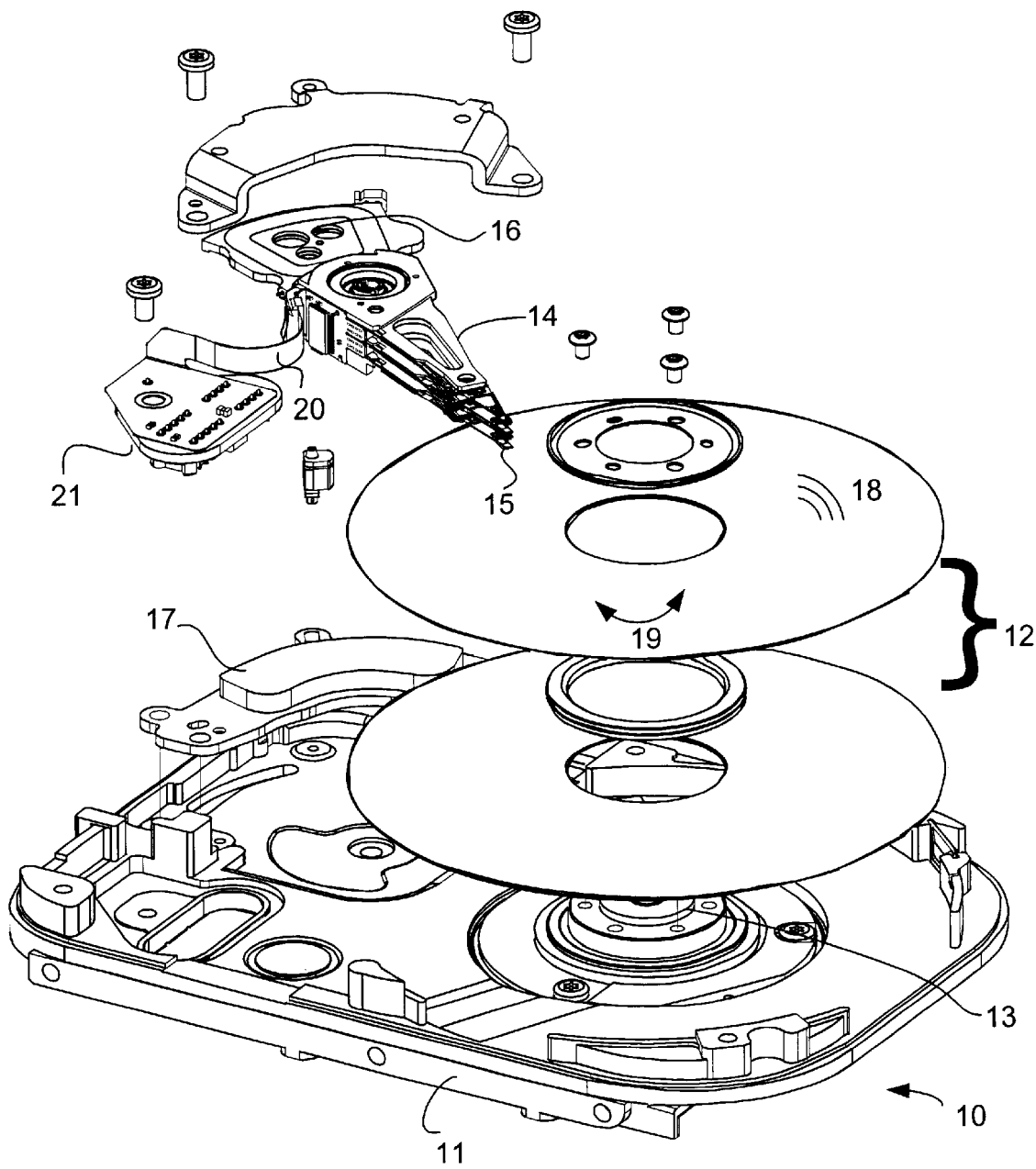
FIG. 1 is an exploded view of a typical disc drive.

FIG. 1 shows an exploded view of a typical disc drive 10. The disc drive 10, which has a housing base 11, also includes a plurality of discs 12 mounted to rotate on a spindle motor 13. An actuator 14, which mounts with a plurality of transducer heads 15, rotates under the control of a voice coil motor (VCM). The VCM includes a voice coil 16 and magnets 17. When a VCM current is fed to the voice coil, electromagnetic forces are generated so that the actuator is rotated and the transducer heads 15 are moved to a desired track 18 along a path 19 on the discs 12. Position signals and data signals from the transducer heads 15 pass via a flex circuit 20 and a connector 21 to and from electronic circuitry on a controller board (not visible). The controller board includes an interface, a serial port connector and a hub connector (the three parts are not visible from the figure).

When the disc drive is in a track following mode, an amount of current ($F_{ivcm}$) is required to allow the disc drive to remain on the track when the drive is placed flat. When the disc drive is in the X or Y orientation, the imbalance torque of the actuator will cause the actuator to draw current to stay on the correct track. The amount of current needed is dependent upon which part of the actuator is heavier while on the track.

Figure 2:
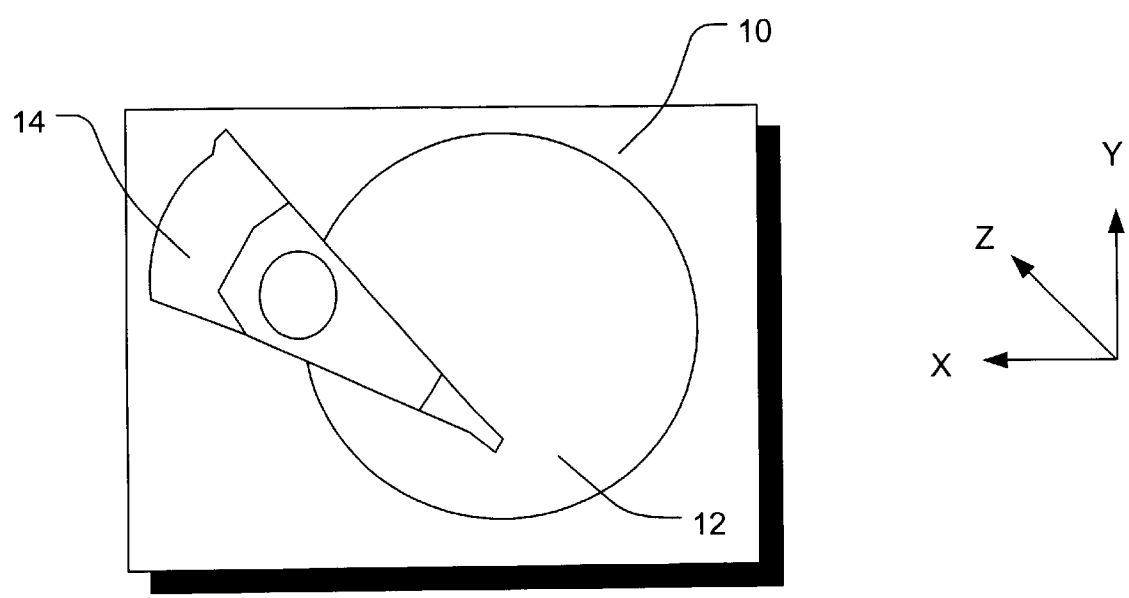
FIG. 2 shows a simplified top view of a disc drive in an X orientation, according to the present invention.
Figure 3:
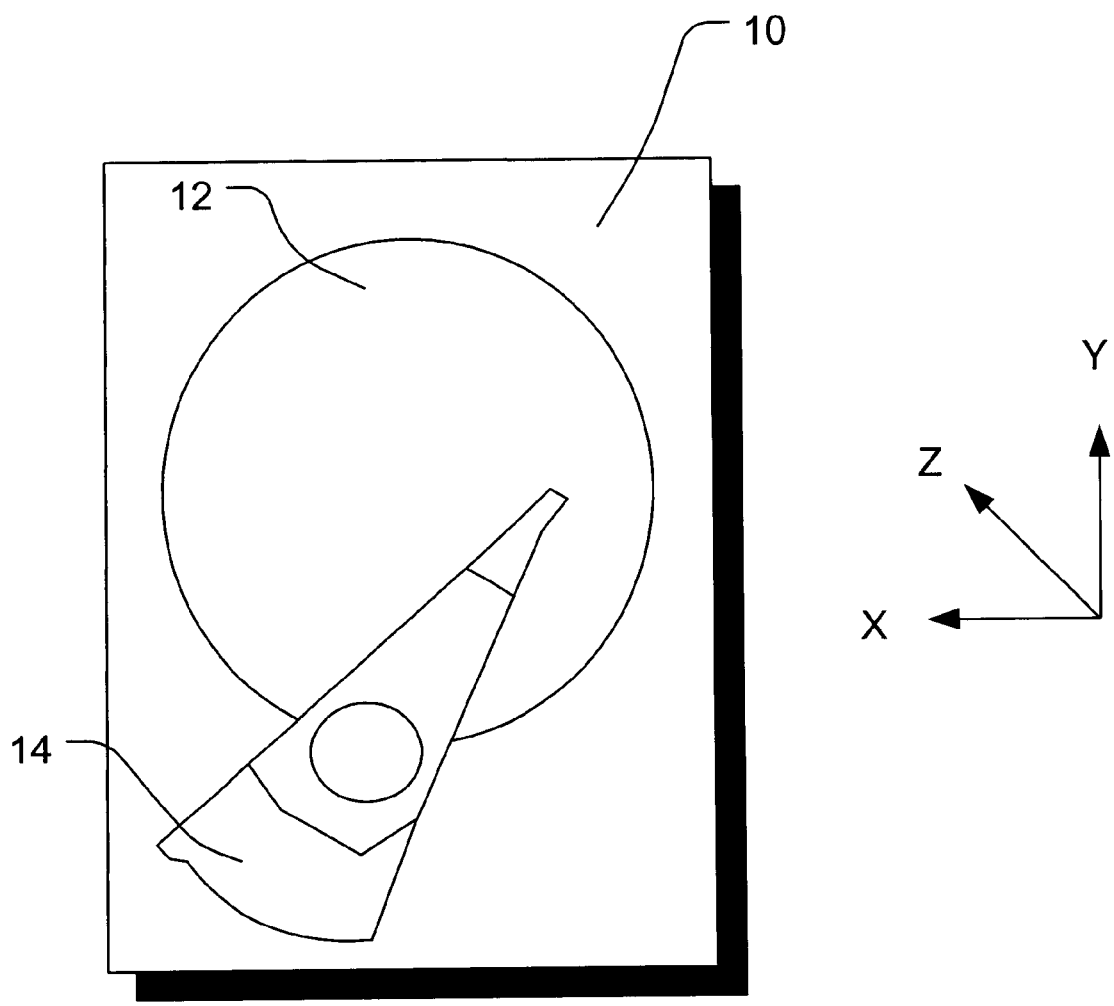
FIG. 3 shows a simplified top view of a disc drive in an Y orientation, according to the present invention.
Figure 4:
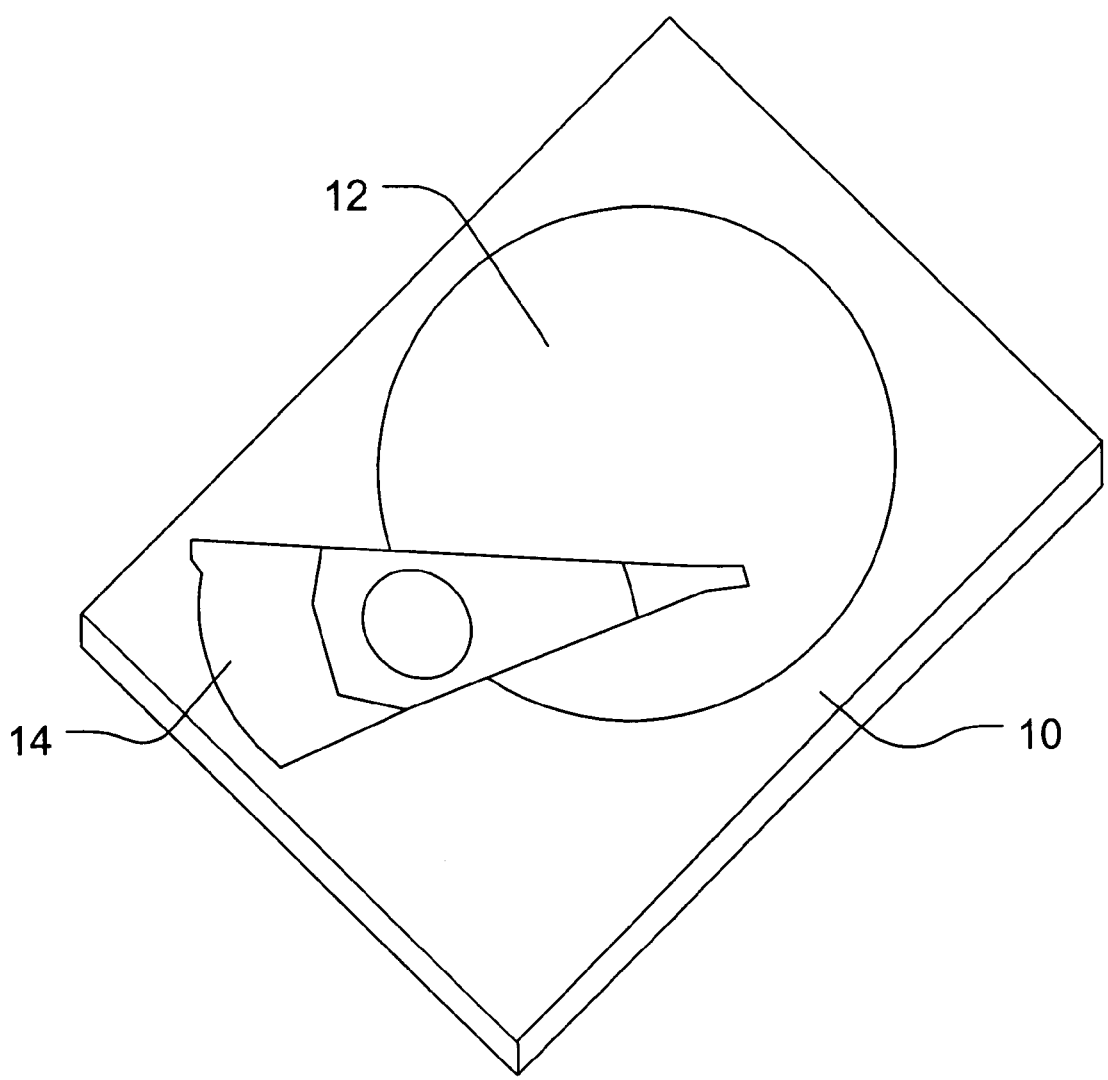
FIG. 4 shows a simplified top view of a disc drive placed flat in a third orientation, according to the present invention.

A preferred embodiment of the present invention is now described as follows with reference to FIGS. 2 to 7. The disc drive 10, configured in the track following mode, is placed in a first orientation 46, designated as the X orientation as shown in FIG. 2. This causes the actuator 14 to draw a first VCM current, $X_{ivcm}$, to keep the transducer heads in the same track. The first VCM current is obtained 48. The disc drive 10 is also placed in a second orientation 50, designated as the Y orientation as shown in FIG. 3. The actuator 14 draws a second VCM current, $Y_{ivcm}$, and this value is obtained 52. The disc drive 10 is placed in a third orientation 54 and VCM current, $F_{ivcm}$, is obtained 56. The third orientation, as shown in FIG. 4, is one in which the disc drive is laid horizontally.

Due to the changes in VCM current, the following equations are applied to calculate the imbalance torque 58:

$$\text{Imbalance, } Imb = \sqrt{(Y_{ivcm} - F_{ivcm})^2 + (X_{ivcm} - F_{ivcm})^2}; \quad (1)$$

$$\text{Imbalance torque, } T_{imb} = Imb \times K_t; \quad (2)$$

where $K_t$ is the torque constant of the voice coil magnet.

Figure 5:
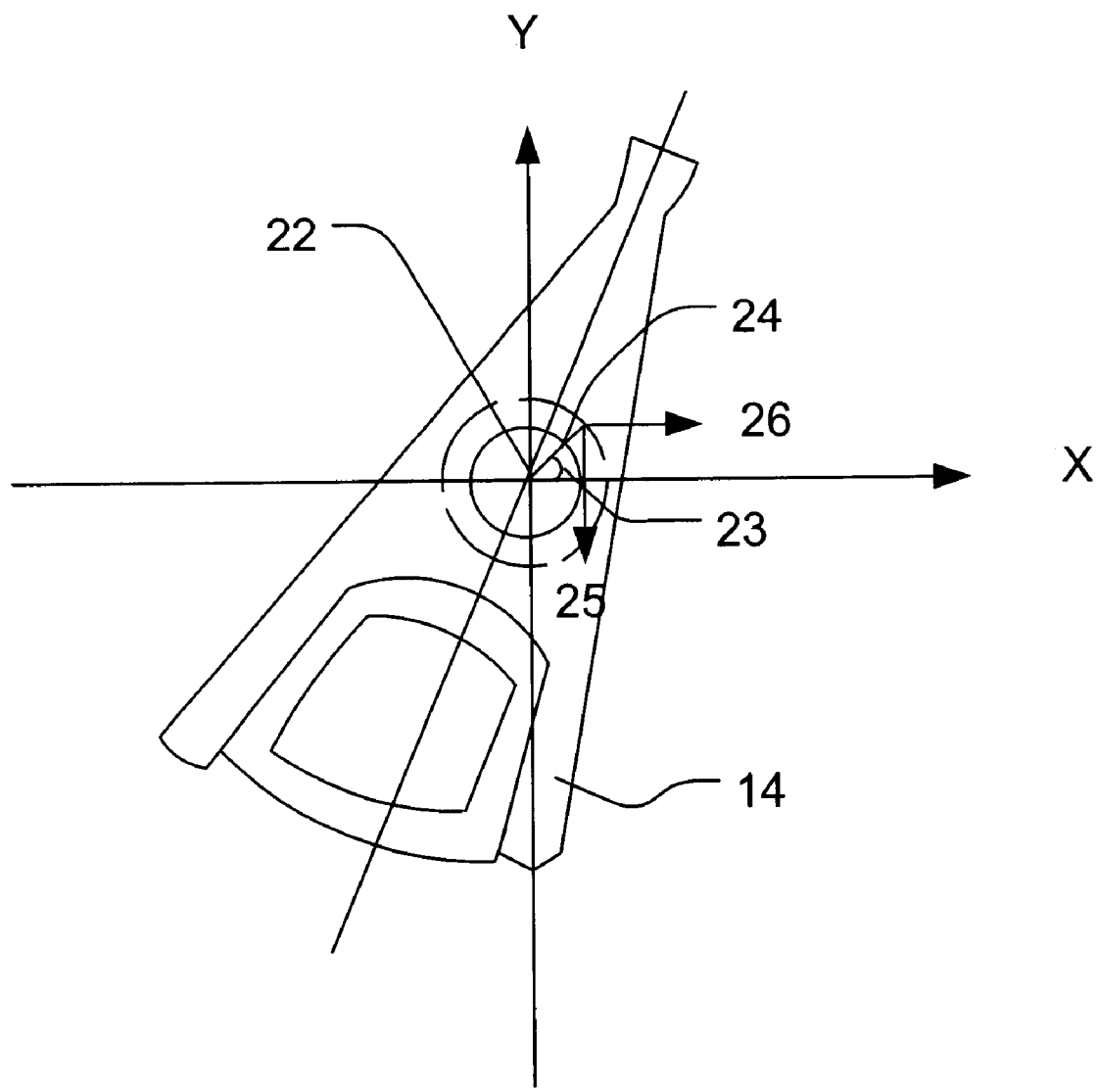
FIG. 5 shows a simplified top view of an actuator for locating the position of the imbalance torque of the actuator in the present invention.

With the values of $Y_{ivcm}$ and $X_{ivcm}$, the location of the imbalance torque of the actuator 14 can be located. As illustrated in FIG. 5, the imbalance torque, $T_{imb}$, determined above is assumed to be one cm from the pivot centre 22. To locate the actual position of the imbalance torque of the actuator 60, an angle 23, θ, between the x-axis and the distance 24, r, of the imbalance torque from the pivot centre is required, as illustrated in FIG. 5. The equation to calculate θ is:

$$\theta = \tan^{-1} \frac{Y_{ivcm}}{X_{ivcm}}; \quad (3)$$

where $Y_{ivcm}$ 25 and $X_{ivcm}$ 26 are obtained from the above method.

Since θ can be calculated from the above equation and mass, m, of the actuator can be measured, the distance of the imbalance torque from the pivot centre 24, r, can thus be located from the following equations:

$$Y_{ivcm} = mg \times r \times \sin \theta \quad (4)$$

$$X_{ivcm} = mg \times r \times \cos \theta \quad (5)$$

Figure 7:
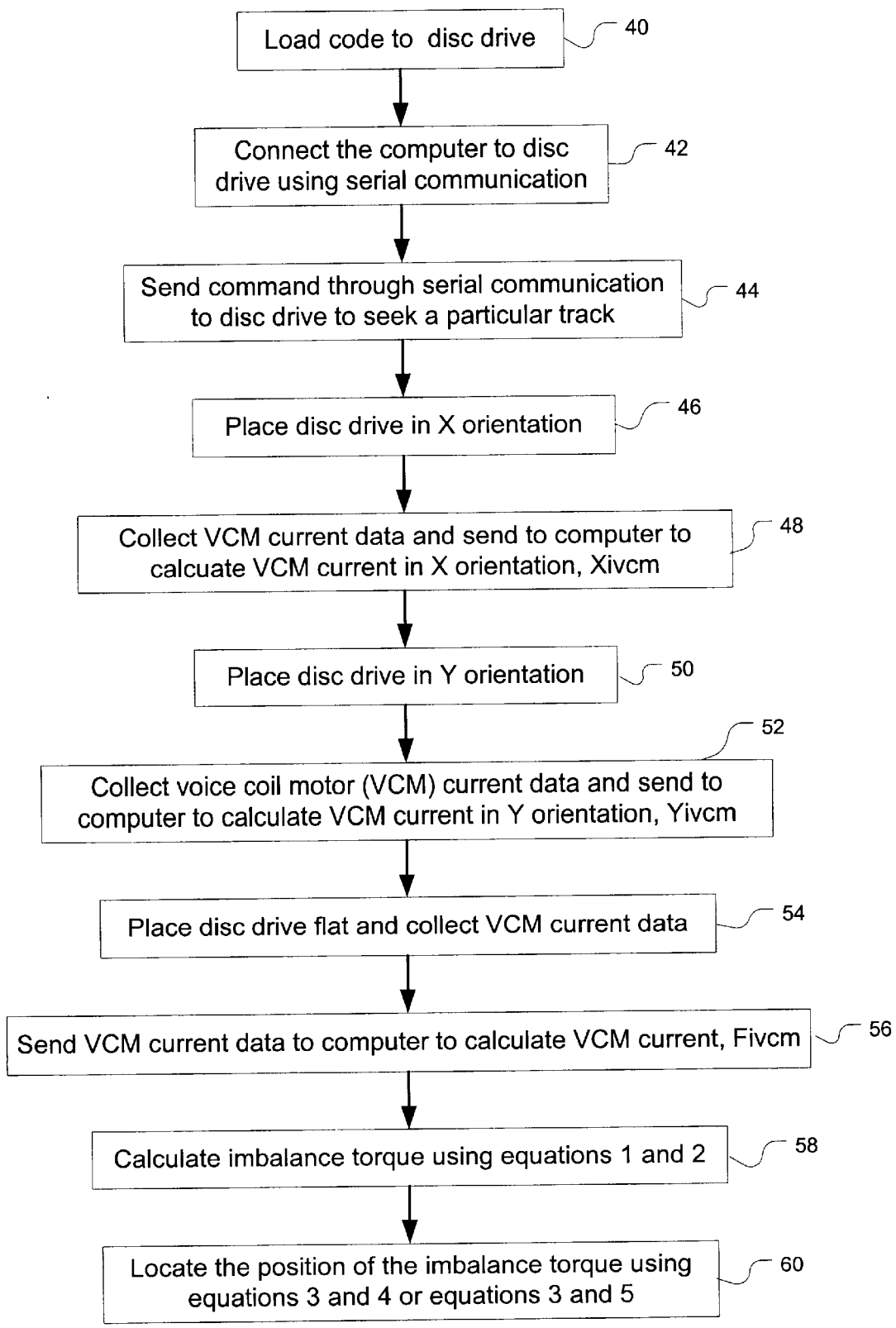
FIG. 7 shows a flowchart of a disc drive configured in track following mode.

This method is implemented into a software program and tested on a disc drive as illustrated in FIG. 7. The method may be preceded by steps of loading a program code to the disc drive 40. The program code embodies instructions for executing a method of the present invention. The disc drive is connected to a computer system using serial communication 42. A command is sent to the disc drive, from the computer system, to seek a particular track 44.

Figure 6:
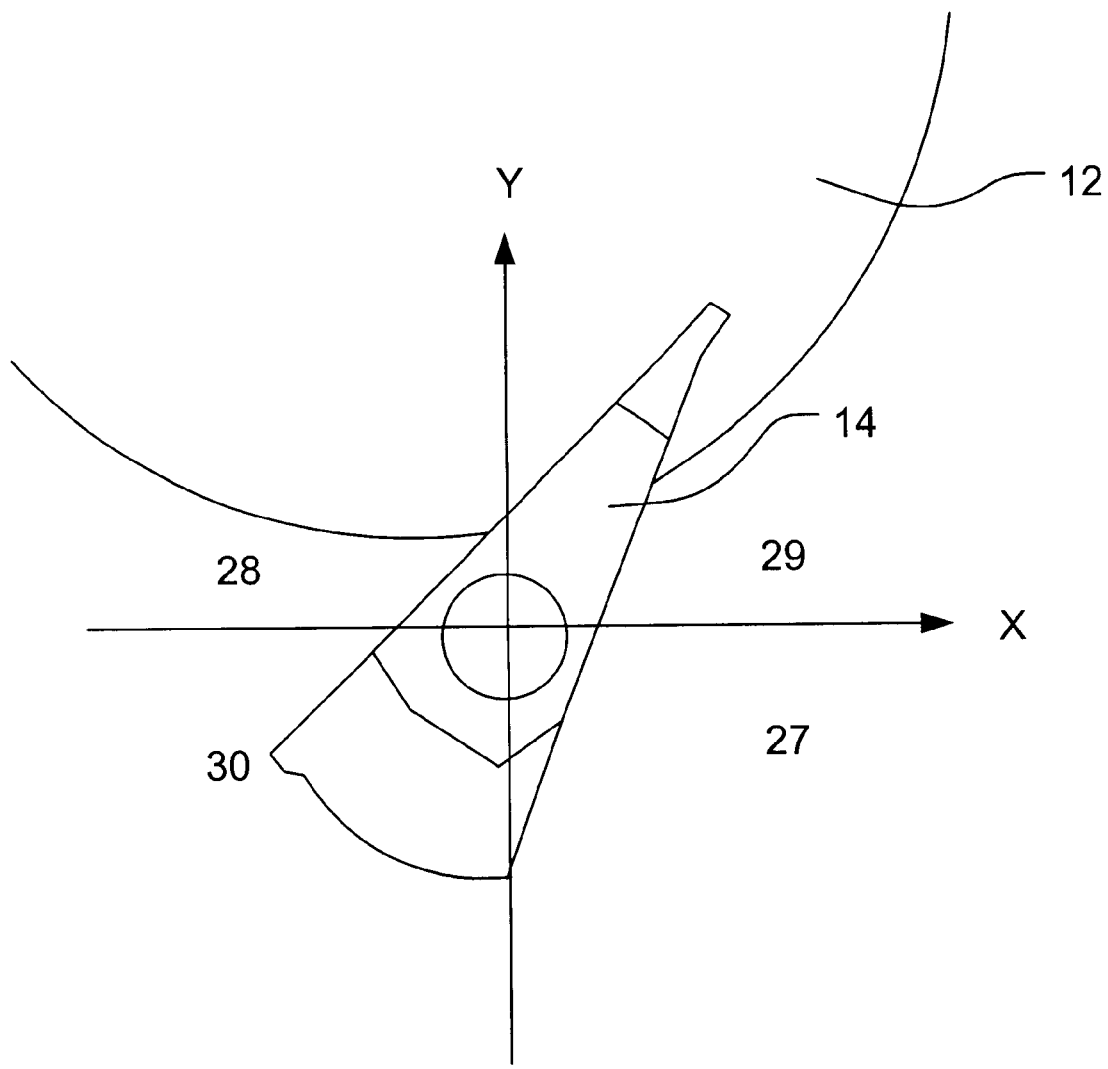
FIG. 6 shows a simplified top view of an actuator showing four possible zones where the imbalance torque of the actuator may be located.

From the valves of $Y_{ivcm}$ and $X_{ivcm}$ obtained, the position of imbalance torque of the actuator can be deduced based on the algorithm below and as shown in FIG. 6:

(a) If $Y_{ivcm} > F_{ivcm}$ AND $X_{ivcm} < F_{ivcm}$, the location of the imbalance torque is at portion A 27.

(b) If $Y_{ivcm} < F_{ivcm}$ AND $X_{ivcm} > F_{ivcm}$, the location of the imbalance torque is at portion B 28.

(c) If $Y_{ivcm} > F_{ivcm}$ AND $X_{ivcm} > F_{ivcm}$, the location of the imbalance torque is at portion C 29.

(d) If $Y_{ivcm} < F_{ivcm}$ AND $X_{ivcm} < F_{ivcm}$, the location of the imbalance torque is at portion D 30.

The portions are defined with respect to a pair of X and Y-axes intersecting at the pivot point of the actuator. The portion A refers to the fourth quadrant, the portion B refers to the second quadrant, the portion C refers to the first quadrant and the portion D refers to the third quadrant in this frame of reference.

In another embodiment of the method to determine the imbalance torque, the disc drive is placed in a position with the use of an external fixture such that the actuator is in a first plane and the VCM current, $X_{ivcm}$, is obtained. The disc drive is placed flat and the VCM current, $F_{ivcm}$, is obtained. The imbalance torque is calculated as follows:

$$\text{Imbalance torque, } T_{imb} = (X_{ivcm} - F_{ivcm}) \times K_t$$

where $K_t$ is the torque constant

Another way of describing the present invention is as follows:

A program storage device readable by a computer system tangibly embodying a program of instructions executable by the computer system to perform a method for determining an imbalance torque of an actuator 14 in a disc drive 10, the actuator 14 being configured to be rotated about a pivot point 22 by a voice coil motor (VCM) 16,17, the VCM being operable by a VCM current, the imbalance torque being characterized by a center of imbalance 23,24, and a magnitude of imbalance, the method including steps of: obtaining a first VCM current ($X_{ivcm}$) when the disc drive is placed in a first plane characterized by a normal parallel to an X-axis; obtaining a third VCM current ($F_{ivcm}$) when the disc drive is placed in a horizontal plane characterized by a vertical normal. The X-axis and the vertical axis are orthogonal to one another. The method includes a step of obtaining a first difference between the first VCM current and the third VCM current; and obtaining the magnitude of the imbalance torque from the first difference.

According to one embodiment of the invention, the first difference is multiplied by a torque constant to obtain the magnitude of imbalance.

According to another embodiment of the invention, the method further involves obtaining a second VCM current ($Y_{ivcm}$) when the disc drive is placed in a second plane characterized by a normal parallel to a Y-axis. The X-axis, the Y-axis and the vertical axis are orthogonal to one another. The method further includes obtaining a second difference between the second VCM current and the third VCM current; adding together the square of the first difference and the square of the second difference to give a first intermediate value; and obtaining the square root of the first intermediate value to give an imbalance value. The imbalance value is multiplied by a torque constant to obtain the magnitude of imbalance.

Preferably, the method further involves steps of: dividing the second VCM current value by the first VCM current value to obtain a second intermediate value; and applying a predetermined function to the second intermediate value to obtain an angle, such that the angle is representative of an angular displacement of the center of imbalance from the X-axis. The method can further involve steps of applying a cosine function to the angle obtained to give a third intermediate value; multiplying the mass of the actuator with the third intermediate value to obtain a fourth intermediate value; and dividing the first VCM current with the third intermediate value to determine a displacement of the imbalance torque center from the pivot point. Alternatively, the method can further involve steps of applying a sine function to the angle obtained to give a third intermediate value; multiplying the mass of the actuator with the third intermediate value to obtain a fourth intermediate value; and dividing the second VCM current with the third intermediate value to determine a displacement of the imbalance torque center from the pivot point.

According to one aspect of the invention, the method provides for estimating the position of the center of imbalance. The center of imbalance is estimated to be in a first quadrant if $Y_{ivcm}$ is greater than $F_{ivcm}$ and if $X_{ivcm}$ is greater than $F_{ivcm}$. It is estimated to be in a second quadrant if $Y_{ivcm}$ is less than $F_{ivcm}$ and if $X_{ivcm}$ is greater than $F_{ivcm}$. If $Y_{ivcm}$ is lesser than $F_{ivcm}$ and $X_{ivcm}$ is less than $F_{ivcm}$, the center of imbalance is estimated to be in the third quadrant. If $Y_{ivcm}$ is greater than $F_{ivcm}$ and if $X_{ivcm}$ is less than $F_{ivcm}$, the center of imbalance is estimated to be in the fourth quadrant. For reference, the disc drive is placed in the horizontal plane with the pivot point coinciding with the intersection of the X-axis and the Y-axis. The first quadrant, the second quadrant, the third quadrant and the fourth quadrants are defined with reference to the X-axis and the Y-axis.

It is to be understood that even though numerous characteristics and advantages of various embodiments of the present invention have been set forth in the foregoing description, together with details of the structure and function of various embodiments of the invention, this disclosure is illustratively only, and changes may be made in detail, especially in the matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a disc drive, it will be appreciated by those skilled in the art that the teachings of the present invention can be applied to other systems, without departing from the scope and spirit of the present invention.

What is claimed:

1. A method for determining an imbalance torque of an actuator in a disc drive, the actuator being configured to be rotated about a pivot point by a voice coil motor (VCM), the VCM being operable by a VCM current, the imbalance torque being characterized by a center of imbalance and a magnitude of imbalance, the method comprising steps of:
    (a) obtaining an X orientation VCM current ($X_{ivcm}$) when the disc drive is placed in an X orientation plane, wherein the X orientation plane is characterized by a normal parallel to an X-axis;
    (b) obtaining a horizontal orientation VCM current ($F_{ivcm}$) when the disc drive is placed in a horizontal plane characterized by a vertical normal; wherein the X-axis and the vertical, axis are orthogonal to one another;
    (c) obtaining a first difference between the X orientation VCM current and the horizontal orientation VCM current; and
    (d) obtaining the magnitude of the imbalance torque from the first difference.

2. The method of claim 1 wherein the step (d) includes a step of multiplying the first difference with a torque constant to obtain the magnitude of imbalance.

3. The method of claim 1 further comprising:
    (e) obtaining a Y orientation VCM current ($Y_{ivcm}$) when the disc drive is placed in a Y orientation plane, wherein the Y orientation plane is characterized by a normal parallel to a Y-axis, and wherein the X-axis, the Y-axis and the vertical axis are orthogonal to one another;
    (f) obtaining a second difference between the Y orientation VCM current and the horizontal orientation VCM current;
    (g) adding together the square of the first difference and the square of the second difference to give a first intermediate value;
    (h) obtaining the square root of the first intermediate value to give an imbalance value; and wherein the step (d) includes a step (i) of multiplying the imbalance value with a torque constant to obtain the magnitude of imbalance.

4. The method of claim 3 further comprising steps of:
    (j) dividing the Y orientation VCM current value by the X orientation VCM current value to obtain a second intermediate value; and
    (k) applying a predetermined function to the second intermediate value to obtain an angle, such that the angle is representative of an angular displacement of the center of imbalance from the X-axis.

5. The method of claim 4 further comprising steps of:
    (l) applying a cosine function to the angle obtained in step (k) to give a third intermediate value;
    (m) multiplying the mass of the actuator with the third intermediate value to obtain a fourth intermediate value; and
    (n) dividing the X orientation VCM current with the third intermediate value to determine a displacement of the imbalance torque center from the pivot point.

6. The method of claim 4 further comprising steps of:
    (l) applying a sine function to the angle obtained in step (k) to give a third intermediate value;
    (m) multiplying the mass of the actuator with the third intermediate value to obtain a fourth intermediate value; and
    (n) dividing the Y orientation VCM current with the third intermediate value to determine a displacement of the imbalance torque center from the pivot point.

7. A program storage device readable by a computer system tangibly embodying a program of instructions executable by the computer system to perform a method for determining an imbalance torque of an actuator in a disc drive, the actuator being configured to be rotated about a pivot point by a voice coil motor (VCM), the VCM being operable by a VCM current, the imbalance torque being characterized by a center of imbalance and a magnitude of imbalance, the method comprising steps of:
    (a) obtaining an X orientation VCM current ($X_{ivcm}$) when the disc drive is placed in an X orientation plane, wherein the X orientation plane is characterized by a normal parallel to an X-axis;
    (b) obtaining a horizontal orientation VCM current ($F_{ivcm}$) when the disc drive is placed in a horizontal plane characterized by a vertical normal; wherein the X-axis and the vertical axis are orthogonal to one another;
    (c) obtaining a first difference between the X orientation VCM current and the horizontal orientation VCM current; and
    (d) obtaining the magnitude of the imbalance torque from the first difference.

8. The method of claim 7 wherein the step (d) includes a step of multiplying the first difference with a torque constant to obtain the magnitude of imbalance.

9. The method of claim 7 further comprising:
    (e) obtaining a Y orientation VCM current ($Y_{ivcm}$) when the disc drive is placed in a Y orientation plane, wherein the Y orientation plane is characterized by a normal parallel to a Y-axis, and wherein the X-axis, the Y-axis and the vertical axis are orthogonal to one another;

(f) obtaining a second difference between the Y orientation VCM current and the horizontal orientation VCM current;

(g) adding together the square of the first difference and the square of the second difference to give a first intermediate value;

(h) obtaining the square root of the first intermediate value to give an imbalance value; and wherein the step (d) includes a step (i) of multiplying the imbalance value with a torque constant to obtain the magnitude of imbalance.

10. The method of claim 9 further comprising steps of:

(j) dividing the Y orientation VCM current value by the X orientation VCM current value to obtain a second intermediate value; and (k) applying a predetermined function to the second intermediate value to obtain an angle, such that the angle is representative of an angular displacement of the center of imbalance from the X-axis.

11. The method of claim 10 further comprising steps of:

(l) applying a cosine function to the angle obtained in step (k) to give a third intermediate value;

(m) multiplying the mass of the actuator with the third intermediate value to obtain a fourth intermediate value; and (n) dividing the first VCM current with the third intermediate value to determine a displacement of the imbalance torque center from the pivot point.

12. The method of claim 10 further comprising steps of:

(l) applying a sine function to the angle obtained in step (k) to give a third intermediate value;

(m) multiplying the mass of the actuator with the third intermediate value to obtain a fourth intermediate value; and (n) dividing the Y orientation VCM current with the third intermediate value to determine a displacement of the imbalance torque center from the pivot point.

13. The method of claim 9 further comprising steps of:

(o) estimating the position of the center of imbalance to be in a first quadrant if $Y_{ivcm}$ is greater than $F_{ivcm}$ and if $X_{ivcm}$ is greater than $F_{ivcm}$;

(p) estimating the position of the center of imbalance to be in a second quadrant if $Y_{ivcm}$ is less than $F_{ivcm}$ and if $X_{ivcm}$ is greater than $F_{ivcm}$;

(q) estimating the position of the center of imbalance to be in a third quadrant if $Y_{ivcm}$ is lesser than $F_{ivcm}$ and $X_{ivcm}$ is less than $F_{ivcm}$; and (r) estimating the position of the center of imbalance to be in a fourth quadrant if $Y_{ivcm}$ is greater than $F_{ivcm}$ and if $X_{ivcm}$ is less than $F_{ivcm}$, wherein the disc drive is placed in the horizontal plane with the pivot point coinciding with the intersection of the X-axis and the Y-axis, and wherein the first quadrant, the second quadrant, the third quadrant and the fourth quadrants are defined with reference to the X-axis and the Y-axis.

14. A disc drive comprising:

a disc formatted to store data;

a transducer head configured for reading data from and writing data to the disc;

an actuator supporting the transducer head in proximity to the disc; and means for determining an imbalance torque of the actuator.

* * * * *